United States Patent
Cronin (10) Patent No.: US 12,450,054 B2
(45) Date of Patent: Oct. 21, 2025

(54) SET CONTAINMENT OPERATION WITH RANGE CONSTRUCTS

(71) Applicant: Arista Networks, Inc., Santa Clara, CA (US)

(72) Inventor: David Cronin, Dublin (IE)

(73) Assignee: ARISTA NETWORKS, INC., Santa Clara, CA (US)

( * ) Notice: Subject to any disclaimer, the term of this patent is extended or adjusted under 35 U.S.C. 154(b) by 234 days.

(21) Appl. No.: 18/050,262

(22) Filed: Oct. 27, 2022

(65) Prior Publication Data

US 2024/0143324 A1    May 2, 2024

(51) Int. Cl.
*G06F 9/30* (2018.01)
*G06F 16/245* (2019.01)

(52) U.S. Cl.
CPC ...... *G06F 9/30036* (2013.01); *G06F 9/30021* (2013.01); *G06F 16/245* (2019.01)

(58) Field of Classification Search
CPC . G06F 9/30036; G06F 9/30021; G06F 16/245
See application file for complete search history.

(56) References Cited

U.S. PATENT DOCUMENTS

2019/0261199 A1* 8/2019 Salkintzis ............. H04W 28/18
2023/0038824 A1    2/2023 Mahadevan et al.

OTHER PUBLICATIONS

Morelli, Binary Search in JavaScript. A practical Example, Aug. 7, pp. 1-14 (Year: 2017).*
Vincent, Algorithms: Binary Search, pp. 1-5 (Year: 2018).*
Striver, Search an element in given N ranges, pp. 1-17 (Year: 2021).*

* cited by examiner

*Primary Examiner* — Albert M Phillips, III
(74) *Attorney, Agent, or Firm* — Fountainhead Law Group, PC (57) ABSTRACT

Processing a set containment operation that includes a combination of singleton values and value ranges includes first searching the subset of singleton values. The first search is performed in O(log(n)) time, where n is the number of singleton values. If the first search does not find the target value in the singleton subset, then a second search is performed on each value range. The second search is performed in O(n) time where n is the number of value ranges.

19 Claims, 5 Drawing Sheets

SET CONTAINMENT OPERATION WITH RANGE CONSTRUCTS

CROSS REFERENCE TO RELATED APPLICATIONS

The present disclosure relates to commonly owned U.S. application Ser. No. 17/392,519, entitled "Efficient Runtime Evaluation Representation, External Construct Late-binding, and Updating Mechanisms For Routing Policies," filed Aug. 3, 2021, and is incorporated herein by reference in its entirety for all purposes.

BACKGROUND

Routing policies in a network device (e.g., switch, router, etc.) can specify which routes and how those routes are programmed into the device's routing tables. Users can create routing policies with technologies such as route-maps and RCFs (Routing Control Functions) to implement granular network controls. RCF is a tool that allows the user to define policy functions to evaluate routes. A common operation is matching one or more path attributes of a candidate route against corresponding sets of attributes to decide how to process the candidate. This operation can be referred to as a "set containment operation."

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
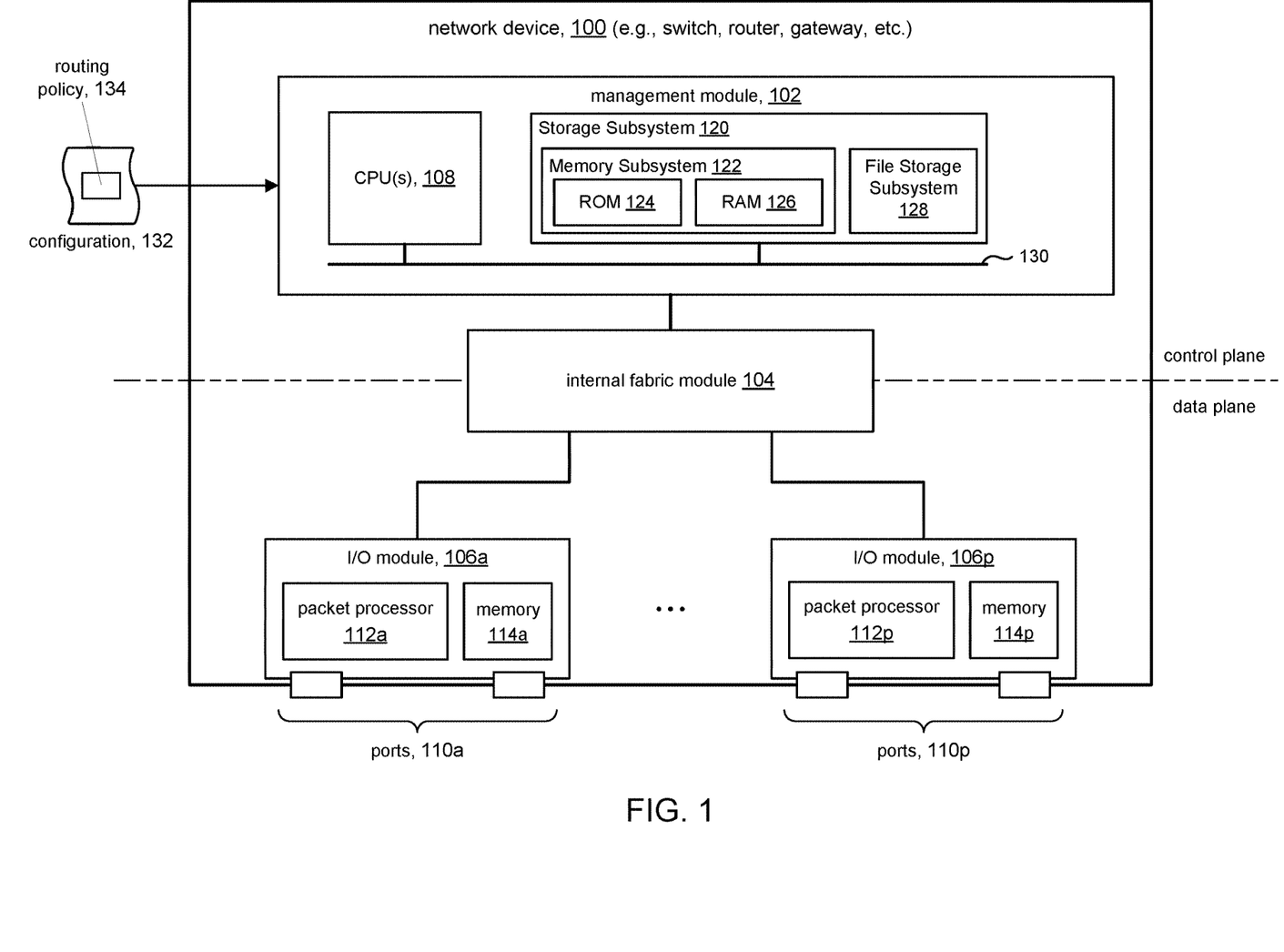
FIG. 1 is a high level representation of a network device in accordance with some embodiments.

FIG. 1 is a schematic representation of a network device (e.g., switch, router, etc.) that can be adapted in accordance with the present disclosure. In some embodiments, network device 100 can include a management module 102, an internal fabric module 104, and a number of I/O modules 106a-106p. Management module 102 can constitute the control plane (also referred to as control layer or simply the CPU) of network device 100 and can include one or more management CPUs 108 for managing and controlling operation of network device 100 in accordance with the present disclosure. Each management CPU 108 can be a general-purpose processor, such as an Intel®/AMD® x86, ARM® microprocessor and the like, that operates under the control of software stored in a memory, such as ROM (read-only memory) 124 or RAM (random-access memory) 126. The control plane provides services that include traffic management functions such as routing, security, load balancing, analysis, and the like.

Management module 102 includes one or more management CPUs 108 that communicate with storage subsystem 120 via bus subsystem 130. Storage subsystem 120 can include memory subsystem 122 and non-volatile storage subsystem 128. Storage subsystem 120 represents an example of non-transitory computer-readable storage media that can store program code and/or data, which when executed by one or more management CPUs 108, can cause one or more management CPUs 108 to perform operations in accordance with the present disclosure.

Memory subsystem 122 can include a number of memories including main RAM 126 for storage of instructions and data during program execution and ROM (read-only memory) 124 in which fixed instructions and data are stored. Storage subsystem 128 can provide persistent (i.e., non-volatile) storage for program and data files, and can include various types of storage media known in the art such as solid-state drives, hard-disk drives, and so on.

One or more management CPUs 108 can run a network operating system stored in storage subsystem 120. A network operating system is a specialized operating system for network device 100 (e.g., a router, switch, firewall, and the like). For example, the network operating system may be Arista Extensible Operating System (EOS®), which is a fully programmable and highly modular, Linux-based network operating system. Other network operating systems may be used.

Bus subsystem 130 can provide a mechanism for letting the various components and subsystems of management module 102 communicate with each other as intended. Although bus subsystem 130 is shown schematically as a single bus, alternative embodiments of the bus subsystem can utilize multiple busses.

Internal fabric module 104 and I/O modules 106a-106p collectively represent the data plane of network device 100 (also referred to as data layer, forwarding plane, etc.). Internal fabric module 104 represents interconnections among the various other modules of network device 100. Each I/O module 106a-106p can include one or more input/output (ingress/egress) ports 110a-110p that are used by network device 100 to receive and forward network traffic. Each I/O module 106a-106p can also include packet processing capability, logically represented by respective packet processors 112a-112p and memory components 114a-114p. Packet processors 112a-112p can comprise forwarding hardware, including for example, data processing elements such as an ASIC (application specific integrated circuit), FPGA (field programmable array), digital processing unit, and the like. Memory components 114a-114p can include lookup hardware, including for example, content addressable memory such as TCAMs (ternary CAMs) and auxiliary memory such as SRAMs (static random access memory). The forwarding hardware in conjunction with the lookup hardware can provide wire speed decisions on how to process ingress packets and outgoing packets for egress. In accordance with some embodiments, some aspects of the present disclosure may be performed within the data plane.

Configuration 132 can be provided to network device 100 to configure various aspects of the network device; e.g., which users can log into the device, DNS (directory name server) configuration, protocol configuration, hardware configuration, and so on. In some embodiments, configuration 132 can include routing policy 134 which represents an organization's policy for how routes are to be treated in the organization within which the network device is deployed; e.g., determine egress interface, VLAN tag manipulation, VxLAN encapsulation, etc.

Figure 2:
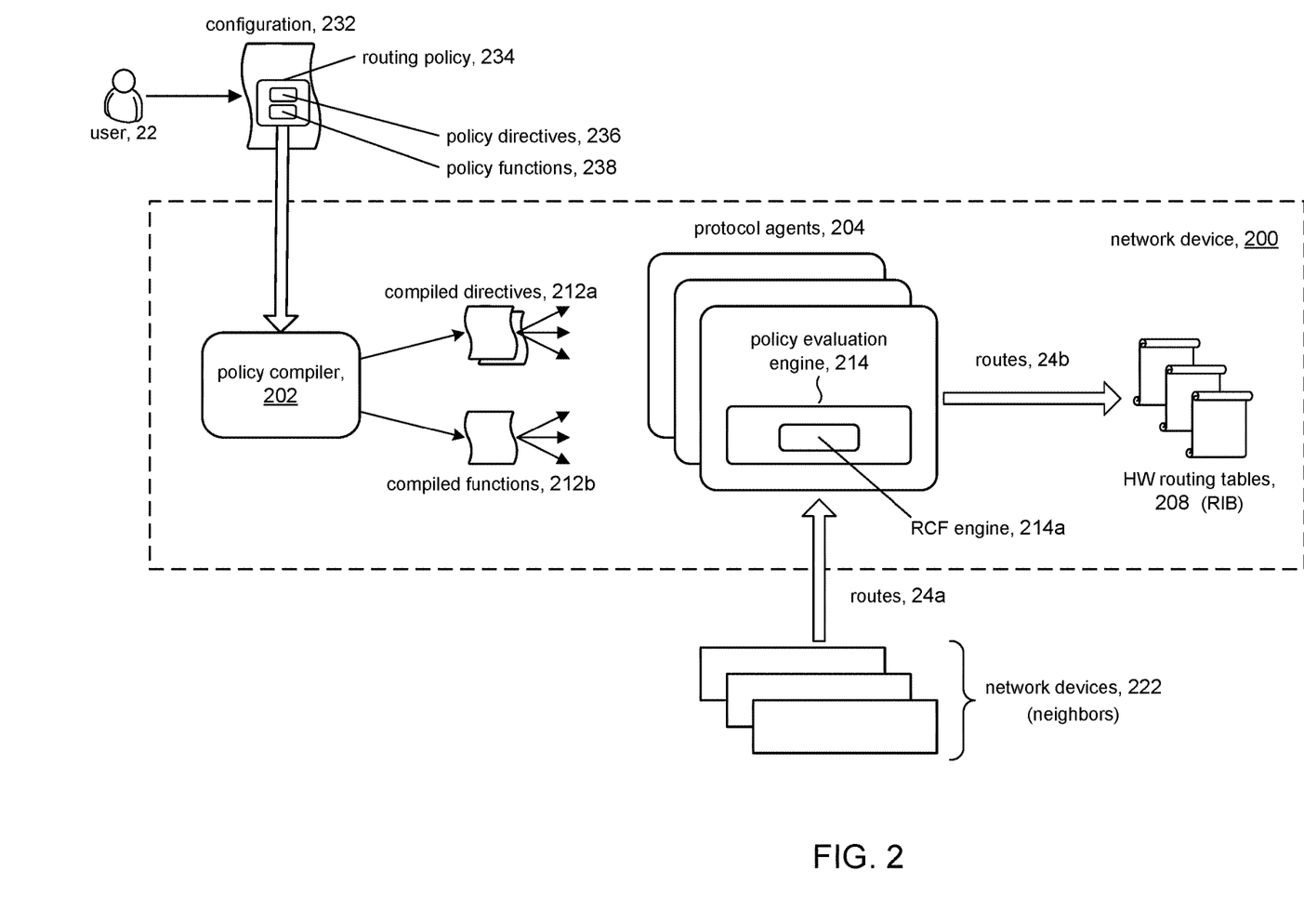
FIG. 2 illustrates policy processing elements in a network device in accordance with some embodiments.

FIG. 2 is a generalized schematic representation of a workflow in a network device for processing routes in accordance with the present disclosure. In some embodiments, for example, network device 200 can include policy compiler 202 to process a routing policy; e.g., routing policy 234 contained in configuration file 232 which, for example, can be provided by a user 22, a centralized network controller, etc. Policy compiler 202 can include one or more components to compile or otherwise translate the user-readable text that constitutes routing policy 234. Routing policy 234 can include policy directives 236 and policy functions 238, as shown for example in FIG. 3. In some embodiments, policy compiler 202 can include a translator to produce a suitable internal representation of policy directives 236 which is generically represented in FIG. 2 as compiled directives 212a.

In accordance with some embodiments, policy functions 238 can be written in a language called Routing Control Functions (RCF) developed and sold/licensed by Arista Networks, Inc. of Santa Clara, California. Users (e.g., network or system administrators) can write policy functions that express and evaluate policies such as route filtering and attribute modification in a programmatic fashion to facilitate processing of routes. Redundant multi-line policy directives in the routing policy, for example, can be defined as discrete functions referred to as policy functions to improve readability, support, and maintenance. Policy functions can perform certain common actions such as setting routes, VLAN tagging (virtual local area network), and so on. Policy compiler 202 can include a compiler to produce a suitable internal representation of policy functions 238, represented in FIG. 2 as compiled functions 212b.

Network device 200 can include protocol agents 204 (e.g., spanning tree protocol, address resolution protocol, boundary gateway protocol, etc.) that communicate with other network devices (neighbors, peers, etc.) 222 to exchange (receive, advertise) routes 24a. Protocol agents 204 can use the various compiled directives 212a and compiled functions 212b to evaluate received routes 24a in accordance with the routing policy 234 and output routes 24b to be stored in hardware routing tables 208 (e.g., routing information base, RIB) of the network device 200. In some embodiments, hardware routing tables 208 can comprise TCAMs, SRAMs, etc.

Each policy agent 204 can include a policy evaluation engine 214. During processing of a received route 24a, the policy evaluation engine 214 can use one or more of the compiled directives 212a and compiled functions 212b to determine how to program the received route. Policy evaluation engine 214 can create or otherwise represent an execution environment within which to execute the compiled directives and compiled functions.

In accordance with some embodiments, for example, the policy evaluation engine 214 can include an RCF engine 214a that creates or otherwise represents an RCF execution environment for executing compiled functions 212b. The nature of the RCF execution environment depends on the nature of the RCF language that is used to write policy functions. In some embodiments, for example, RCF can be an interpreted language, not unlike the BASIC programming language, and RCF engine 214a can be an interpreter that interprets human-readable RCF policy functions directly without compiling the functions. In some embodiments, RCF can be a partially compiled language. For example, policy functions can be compiled into an intermediate representation (e.g., bytecode) and RCF engine 214a can be an interpreter that interprets the intermediate representation. In some embodiments, RCF can be compiled into binary code and RCF engine 214a can be a virtual machine that executes the binary code.

Figure 3:
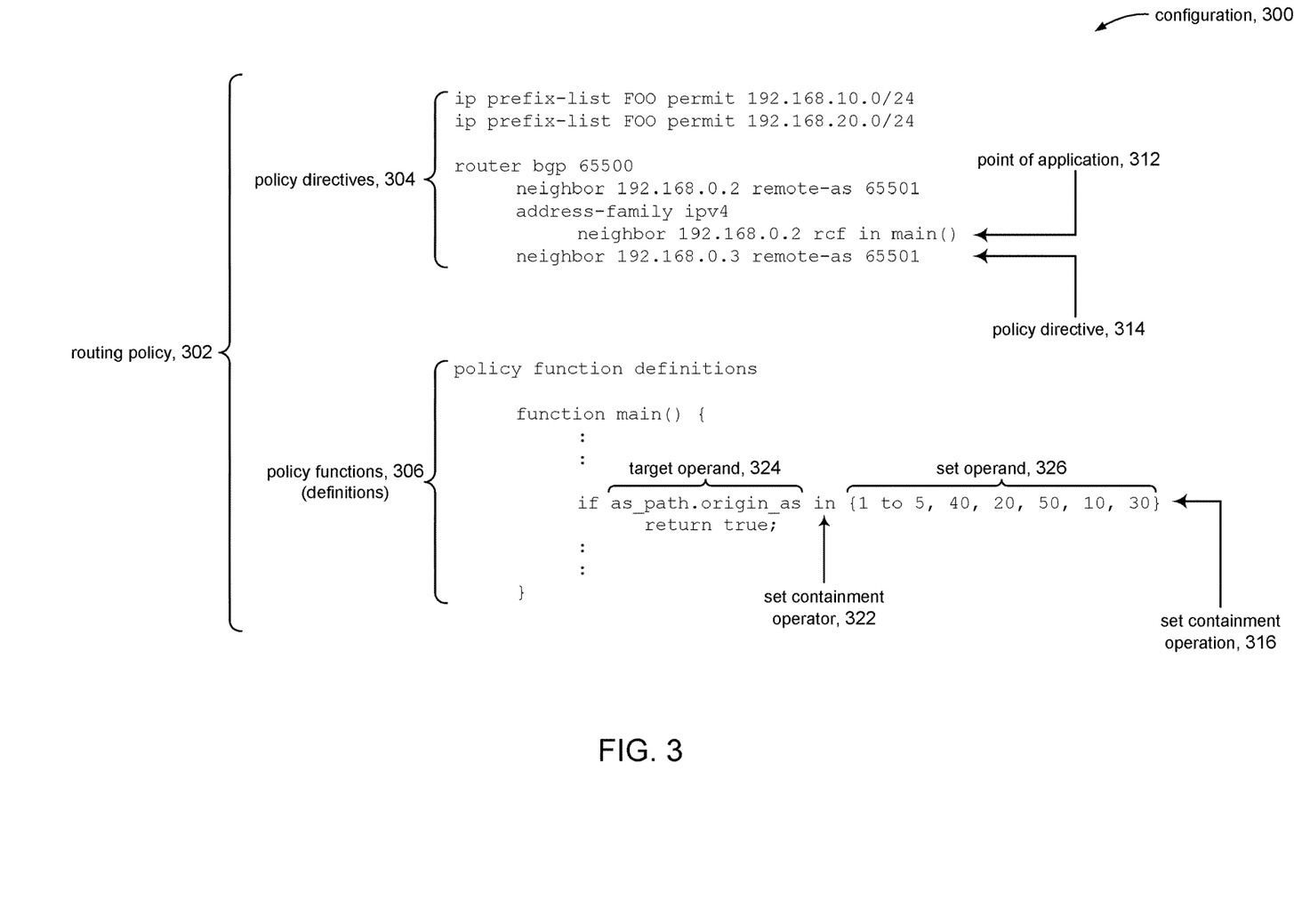
FIG. 3 is an illustrative example of a policy configuration, showing a set containment operation.

FIG. 3 shows a snippet of a configuration 300 that contains a simplified example of a routing policy 302. A routing policy comprises policy directives 304. As can be seen in FIG. 3, the example routing policy 302 includes a policy directive that invokes a policy function called MAIN( ) the invocation of the policy function can be referred to as the "point of application" 312. Routing policy 302 can include a policy function definition section 306 comprising policy functions, for example, policy function MAIN( ).

When policy function MAIN( ) is encountered at the point of application 312 during execution (evaluation) of routing policy 302, the function is invoked and processing of the routing policy continues within the policy function. When execution of Nain( ) completes, processing of the routing policy continues with policy directive 314 which follows the point of application 312.

Policy functions can include a set containment operation. As shown in FIG. 3, for example, set containment operation 316 can include a set containment operator 322, a target operand 324, and a set operand 326. The set containment operation evaluates to a Boolean; e.g., TRUE if the target operand is contained in the set operand, FALSE otherwise. In FIG. 3, for instance, the set containment operation will evaluate to TRUE or FALSE depending on whether the value in the data structure AS_PATH.ORIGIN_AS (target operand) is among the following set of values (set operand):

{1 to 5, 40, 20, 50, 10, 30}.

The user can express values in the set operand 326 as individual singleton values (e.g., individual values 40, 20, 50, 10, 30), or as one or more ranges of values (e.g., value range "1 to 5"), or as a combination of singleton values and value ranges as illustrated in the example in FIG. 3. Note that there is no restriction on the ordering of singletons or value ranges in the set operand. The singletons can be listed in unsorted order. Value ranges can be intermixed among the singleton values, for example:

(40, 20, 51 to 81, 30, 50, 101 to 120, 10}.

Figure 4:
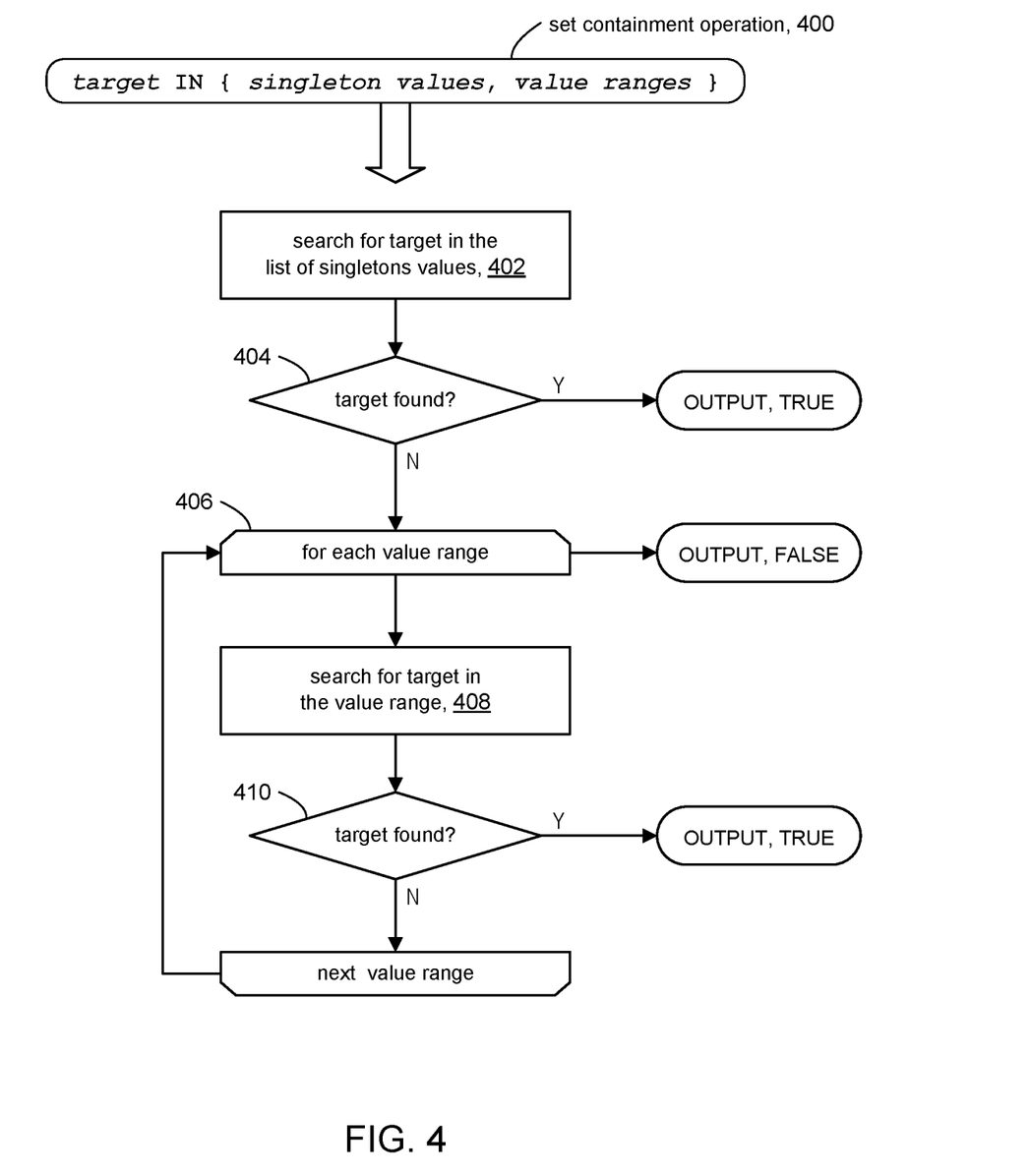
FIG. 4 represents for processing a set containment operation in accordance with some embodiments.

Referring to FIG. 4, the discussion will now turn to a high-level description of a workflow in a network device (e.g., network device 100, FIG. 1 and more particularly RCF engine 214a, FIG. 2) for processing a set containment operation in accordance with the present disclosure. As noted above, a set containment operation can comprise any combination of singleton values and value ranges. For discussion purposes, FIG. 4 shows a set containment operation 400 comprising both singleton values and value ranges.

In some embodiments, the network device can include one or more digital processing units, which when operated, can cause the network device to perform processing in accordance with FIG. 4. Digital processing units can include general CPUs in the control plane of the network device that operate by way of executing computer program code stored on a non-volatile computer readable storage medium (e.g., read-only memory); for example, CPU 108 in the control plane (FIG. 1) can be a general CPU. Digital processing units can include specialized processors in the data plane of the network device, such as digital signal processors, field programmable gate arrays, application specific integrated circuits, and the like, that operate by way of executing computer program code or by way of logic circuits being configured for specific operations. For example, packet processors 112*a*-112*p* in the data plane (FIG. 1) can be a specialized processor. The processing blocks described below are not necessarily executed in the order shown. Actions can be combined or broken out into smaller actions in various embodiments. Actions can be allocated for execution among one or more concurrently executing processes and/or threads.

At block 402, the RCF engine can perform a search on the singleton values (exclusive of the value ranges) in the set containment operation to look for the target. As discussed below, the search can use a search algorithm that has O(log(n)) time complexity (e.g., binary search), where n is the number of singleton values in the set containment operation.

At decision point 404, if the target is found among the singleton values, then the RCF engine can output an evaluation result of TRUE; processing of the set containment operation can be deemed complete. If the target is not found among the singleton values, then the RCF engine can proceed to an iteration loop 406 to search each value range in the set containment operation, one value range at a time.

At block 408, the RCF engine can search a given value range to look for the target. As described below, the "search" can be a test to determine if the target falls within the value range. Each value range in the set containment operation is processed in sequential order. Accordingly, the time to search the target among the set of value ranges takes O(n) takes, where n is the number of value ranges in the set containment operation.

At decision point 410, if the target is found in the given value range, then the RCF engine can output an evaluation result of TRUE; processing of the set containment operation can be deemed complete. If the target is not found in the given value range, then the RCF engine can return to the top of the iteration loop to process the next value range. If there are no more value ranges to process, then the RCF engine can output an evaluation result of FALSE; processing of the set containment operation can be deemed complete.

Figure 5:
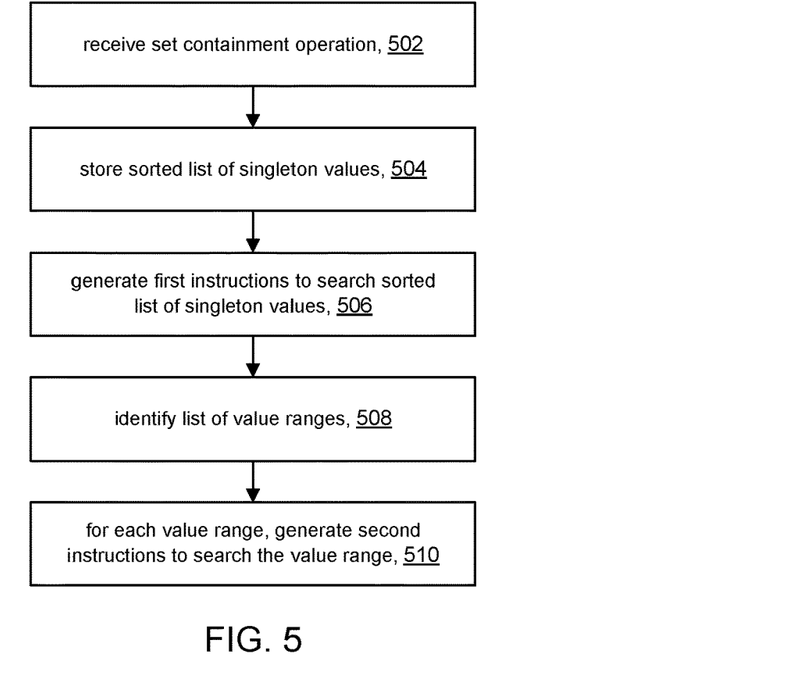
FIG. 5 represents operations for processing a set containment operation to produce an internal representation in accordance with the present disclosure.
Figure 6:
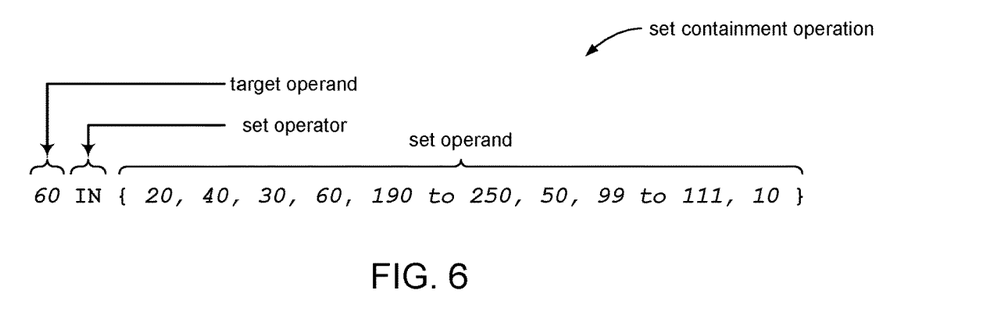
FIG. 6 is an example of a set containment operation.

Referring to FIGS. 5 and 6, the discussion will now turn to a high-level description of a workflow in a network device (e.g., network device 100, FIG. 1 and more particularly policy compiler 202, FIG. 2) for processing (e.g., compiling) a set containment operation in accordance with the present disclosure to produce a suitable internal representation (expressed below in pseudo-code) that can be executed by the network device. In some embodiments, the network device can include one or more digital processing units, which when operated, can cause the network device to perform processing in accordance with FIG. 4. Digital processing units can include general CPUs in the control plane of the network device that operate by way of executing computer program code stored on a non-volatile computer readable storage medium (e.g., read-only memory); for example, CPU 108 in the control plane (FIG. 1) can be a general CPU. Digital processing units can include specialized processors in the data plane of the network device, such as digital signal processors, field programmable gate arrays, application specific integrated circuits, and the like, that operate by way of executing computer program code or by way of logic circuits being configured for specific operations. For example, packet processors 112*a*-112*p* in the data plane (FIG. 1) can be a specialized processor. The processing blocks described below are not necessarily executed in the order shown. Actions can be combined or broken out into smaller actions in various embodiments. Actions can be allocated for execution among one or more concurrently executing processes and/or threads.

At block 502, the policy compiler can receive a set containment operation. As depicted in FIG. 2, for instance, routing policy 234 can be provided to policy compiler 202. The policy compiler can compile set containment operations in policy functions 238 (e.g., RCF functions) contained in the routing policy. FIG. 6 shows an example of a set containment operation for purposes of illustrating the operations in FIG. 5.

At block 504, the policy compiler can scan and parse a set containment operation to identify elements of the operation, including identifying a target operand, the set containment operator, and a set operand. The policy compiler can parse the set operand to identify a set comprising only the singleton values contained in the set operand. In the example shown in FIG. 6, for instance, the target operand is:

and the set of singleton values is:

{20, 40, 30, 60, 50, 10}

In accordance with some embodiments, the set of singleton values can be sorted and stored in a vector in ascending order:

{10, 20, 30, 40, 50, 60}

Figure 7:
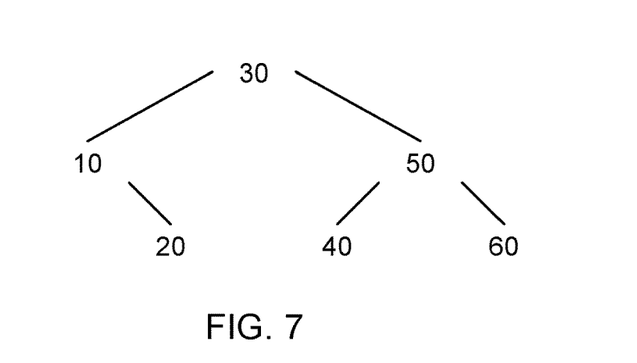
FIG. 7 is an example of a binary tree.

At block 506, the policy compiler can generate instructions for searching the sorted list of singleton values. In some embodiments, for example, the search algorithm can be a binary search that operates on the above vector as if it were stored like the tree shown in FIG. 7. Suppose we are trying to determine if 60 is present in the vector. The algorithm would proceed as follows:

- Compare 60 against the middle value (30) in the vector. 60 is larger, so we go right in the tree.
- Compare 60 against the middle value of the right half (50) of the vector {40, 50, 60}. 60 is larger so we go right in the tree.
- There is only one value to the right, which is 60; we have found that 60 is in the tree.

The binary search was achieved in three comparisons. By comparison, walking the sorted vector and comparing each element until we found the value would have required six comparisons, which is less efficient.

Instructions can be generated to implement this algorithm. In some embodiments, the generated function can be represented by the following recursive algorithm expressed in a C-language type pseudo-code:

```
bool find_value ( Vector _vector, int _target ) {
    if ( _vector.middleValue( ) == _target ) {
        // target found at the current node in the tree
        return true;
    }
    if ( _vector.size( ) == 1 ) {
        // target not found found and there are no more nodes
```

```
        return false;
    }
    if (_vector.middleValue( ) < _target ) {
        return find_value ( _vector.rightHalf( ), _target );
    } else {
        return find_value ( _vector.leftHalf( ), _target );
    }
}
``` where_target is the target value to look for among the singleton values in the set containment operation.

_vector is refers to an instance (e.g., a pointer) of a data structure of type Vector Vector is a data structure that comprises:

an array_vector [ ] that contains a list of singleton values sorted in ascending order (e.g., at block 504), and the following member functions:

.size( )—returns the number of elements in the array

.middleValue( )—returns the number of elements in the array

.rightHalf( )—returns the right half of the array

.leftHalf( )—returns the left half of the array.

If the target value occurs in the sorted list, then the comparison

_vector.middleValue( )==_target will eventually evaluate to TRUE and the function will return TRUE. If the target value does not occur in the sorted list, then the comparison _vector.size( )==1 will eventually evaluate to TRUE and the function will return FALSE. Notably, the search is performed in O(log(n)) time, where n=_vector.size. In the example shown in FIG. 6, for instance, the _vector [ ] array is 10, 20, 30, 40, 50, 60 and target is 60.

At block 508, the policy compiler can parse the set operand to identify a list comprising value ranges contained in the set operand. In the example shown in FIG. 6, for instance, the list (or set) of value ranges is:

"190 to 250", "99 to 111"

At block 510, the policy compiler can generate instructions for searching each value range among the list of value ranges. In some embodiments, for example, the instructions can define a loop that processes each value range, parameterized in the following C-language type pseudo-code as follows:

```
for i = 0; i < _numRanges; ++i) {
    if (_target >= _minval[i] && _target <= _maxval[i]) return TRUE;
}
return FALSE;
``` where _numRanges is the number of value ranges in the set containment operation

_minval [ ] and maxval [ ] are vectors that contain, respectively, the minimum and maximum values in each value range, and _target is the value to look for within the range.

The code will either exit with TRUE from within the FOR loop in response to _target being in one of the value ranges, or FALSE when the code falls out of the FOR loop because _target is not in any of the value ranges.

In the example shown in FIG. 6, for instance, the following instructions can be generated to test the value ranges:

```
for (i = 0; i < 2; ++i) {
    if (60 >= _minval[i] && 60 <= _maxval[i]) return TRUE;
}
return FALSE;
``` where _target is 60

_minval [ ] is {190, 99}

_maxval [ ] is {250, 111}

It can be seen that the FOR loop is performed in O(n) time, where n is the number of value ranges, namely 2.

Following is a pseudo-code representation of a compiled example of FIG. 6 that can be executed by the network device:

```
// initialize vectors
_vector[ ] = { 10, 20, 30, 40, 50, 60 };
_minval[ ] = {190, 99};
_maxval[ ] = {250, 111};
// test the set of singletons
bool find_value ( Vector _vector, int _target ) {
    if ( _vector.middleValue( ) == _target ) {
        // target found at the current node in the tree
        return true;
    }
    if ( _vector.size( ) == 1 ) {
        // target not found found and there are no more nodes
        return false;
    }
    if (_vector.middleValue( ) < _target ) {
        return find_value ( _vector.rightHalf( ), target );
    } else {
        return find_value ( _vector.leftHalf( ), target );
    }
}
// test each value range
for (i = 0; i < 2; ++i) {
    if (60 >= _minval[i] && 60 <= _maxval[i]) {
        return TRUE;
    }
}
// target value is not in the set operand
return FALSE;
```

Further Examples

Features described above as well as those claimed below may be combined in various ways without departing from the scope hereof. The following examples illustrate some possible, non-limiting combinations:

(A1) A method in a network device for searching a set of values, the method comprising: receiving program code that includes a set containment operation comprising a target operand and a set operand, the set operand comprising a plurality of singleton values and one or more value ranges; and processing the set containment operation by partitioning the set operand into two lists to reduce execution time of the set containment operation, the processing including: generating a list of singletons comprising only the plurality of singleton values in the set operand; and searching the list of singletons to find a match for the target operand in the list of singletons.

(A2) For the method denoted as (A1), wherein the list of singletons comprises a sorted ordering of the plurality of singleton values in the set operand.

(A3) For the method denoted as any of (A1) through (A2), wherein searching the list of singletons includes performing a binary search on the list of singletons.

(A4) For the method denoted as any of (A1) through (A3), wherein searching the list of singletons is performed in O(log(n)) time, where n is the number of members in the list of singletons.

(A5) For the method denoted as any of (A1) through (A4), wherein partitioning the set operand comprises: generating first search instructions to search the list of singletons using the target operand; and generating second search instructions to search the list of ranges using the target operand.

(A6) The method denoted as any of (A1) through (A5), further comprising: generating a list of ranges comprising only the one or more value ranges in the set operand; and searching the list of ranges to find a match for the target operand in the list of ranges, but only if searching the list of singletons did not result in a match for the target operand.

(A7) For the method denoted as any of (A1) through (A6), wherein searching the list of ranges includes sequentially testing whether the target is in each value range in the list of ranges.

(A8) For the method denoted as any of (A1) through (A7) wherein searching the list of ranges is performed in O(n) time, where n is the number of value ranges in the list of ranges.

(B1) A method in a network device, the method comprising: receiving a search operation to search for a target value in a set of values that comprises a plurality of singleton values and one or more value ranges; searching for the target value in a first subset of the set of values that comprises only the plurality of singleton values in the set of values; and when the target value is not in the first subset, searching for the target value in a second subset of the set of values that comprises only the one or more value ranges, including searching the second subset for the target value one value range at a time, wherein searching the first subset conditionally followed by searching the second subset improves execution time of the search operation.

(B2) For the method denoted as (B1), wherein searching for the target value in the second subset of the set of values includes sequentially testing whether the target is in each value range in the list of ranges.

(B3) For the method denoted as any of (B1) through (B2), wherein the first subset comprises a sorted ordering of the plurality of singleton values in the set of values.

(B4) For the method denoted as any of (B1) through (B3), wherein searching the first subset includes performing a binary search on the plurality of singletons in the first subset.

(B5) For the method denoted as any of (B1) through (B4), wherein searching the first subset is performed in O(log(n)) time, where n is a number of members in the first subset.

(B6) For the method denoted as any of (B1) through (B5), wherein searching the list of ranges is performed in O(n) time, where n is the number of value ranges.

(B7) The method denoted as any of (B1) through (B6), further comprising: generating first search instructions to search the first subset using the target value; and generating second search instructions to search the second subset using the target value.

(C1) A network device comprising: one or more computer processors; and a computer-readable storage medium comprising instructions that control the one or more computer processors to: receive a search operation to search for a target value in a set of values that comprises a plurality of singleton values and one or more value ranges; search for the target value in a first subset of the set of values that comprises only the plurality of singleton values in the set of values; and search for the target value in a second subset of the set of values that comprises only the one or more value ranges, including searching the second subset for the target value one value range at a time when the target value is not found in the first subset, wherein searching the first subset conditionally followed by searching the second subset improves execution time of the search operation.

(C2) For the network device denoted as (C1), wherein searching for the target value in the second subset of the set of values includes sequentially testing whether the target is in each value range in the list of ranges.

(C3) For the network device denoted as any of (C1) through (C2), wherein the first subset comprises a sorted ordering of the plurality of singleton values in the set of values.

(C4) For the network device denoted as any of (C1) through (C3), wherein searching the first subset includes performing a binary search on the plurality of singletons in the first subset.

(C5) For the network device denoted as any of (C1) through (C4), wherein searching the first subset is performed in O(log(n)) time, where n is a number of members in the first subset and searching the list of ranges is performed in O(n) time, where n is the number of value ranges The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device, the method comprising:
receiving routes from one or more network devices in communication with the network device;
for each received route, programming the received route in a hardware table of the network device based on evaluation of a routing policy;
receiving network traffic; and
using routes programmed in the hardware table to process ingress packets in the network traffic for egress,
wherein the routing policy includes program code that includes a set containment operation comprising a route parameter as a target operand and a set operand, the set operand comprising a plurality of singleton values and one or more value ranges,
wherein evaluation of the routing policy includes executing the program code which includes processing the set containment operation by partitioning the set operand into two lists to reduce execution time of the set containment operation, the processing including:
generating a list of singletons comprising only the plurality of singleton values in the set operand;
searching the list of singletons to find a match for the target operand in the list of singletons;
in response to finding a match in the list of singletons, producing a first outcome; and in response to not finding a match in the list of singletons:
generating a list of ranges comprising only the one or more value ranges in the set operand;
searching the list of ranges to find a match for the target operand in the list of ranges;
in response to finding a match in the list of ranges, producing the first outcome; and
in response to not finding a match in the list of ranges, producing a second outcome.

2. The method of claim 1, wherein the list of singletons comprises a sorted ordering of the plurality of singleton values in the set operand.

3. The method of claim 1, wherein searching the list of singletons includes performing a binary search on the list of singletons.

4. The method of claim 1, wherein searching the list of singletons is performed in O(log(n)) time, where n is the number of members in the list of singletons.

5. The method of claim 1, wherein partitioning the set operand comprises:
generating first search instructions to search the list of singletons using the target operand; and
generating second search instructions to search the list of ranges using the target operand.

6. The method of claim 1, wherein searching the list of ranges includes sequentially testing whether the target is in each value range in the list of ranges.

7. The method of claim 1, wherein searching the list of ranges is performed in O(n) time, where n is the number of value ranges in the list of ranges.

8. A method in a network device, the method comprising:
receiving a route to be stored in a routing table of the network device;
programming the received route in a hardware table of the network device based on evaluation of a routing policy;
receiving network traffic; and
using routes programmed in the hardware table to process ingress packets in the network traffic for egress,
wherein evaluation of the routing policy includes performing a search operation to search for a parameter of the received route (a target value) in a set of values that comprises a plurality of singleton values and one or more value ranges, including:
searching for the target value in a first subset of the set of values that comprises only the plurality of singleton values in the set of values; and
when the target value is not in the first subset, searching for the target value in a second subset of the set of values that comprises only the one or more value ranges, including searching the second subset for the target value one value range at a time,
wherein searching the first subset conditionally followed by searching the second subset improves execution time of the search operation.

9. The method of claim 8, wherein searching for the target value in the second subset of the set of values includes sequentially testing whether the target is in each value range in the list of ranges.

10. The method of claim 8, wherein the first subset comprises a sorted ordering of the plurality of singleton values in the set of values.

11. The method of claim 8, wherein searching the first subset includes performing a binary search on the plurality of singletons in the first subset.

12. The method of claim 8, wherein searching the first subset is performed in O(log(n)) time, where n is a number of members in the first subset.

13. The method of claim 8, wherein searching the list of ranges is performed in O(n) time, where n is the number of value ranges.

14. The method of claim 8, further comprising:
generating first search instructions to search the first subset using the target value; and
generating second search instructions to search the second subset using the target value.

15. A network device comprising:
one or more computer processors; and
a computer-readable storage medium comprising instructions that control the one or more computer processors to:
receive a route to be stored in a routing table of the network device;
program the received route in a hardware table of the network device based on evaluation of a routing policy;
receive network traffic; and
use routes programmed in the hardware table to process ingress packets in the network traffic for egress,
wherein evaluation of the routing policy includes performing a search operation to search for parameter of the received route (a target value) in a set of values that comprises a plurality of singleton values and one or more value ranges, including:
searching for the target value in a first subset of the set of values that comprises only the plurality of singleton values in the set of values; and
searching for the target value in a second subset of the set of values that comprises only the one or more value ranges, including searching the second subset for the target value one value range at a time when the target value is not found in the first subset,
wherein searching the first subset conditionally followed by searching the second subset improves execution time of the search operation.

16. The network device of claim 15, wherein searching for the target value in the second subset of the set of values includes sequentially testing whether the target is in each value range in the list of ranges.

17. The network device of claim 15, wherein the first subset comprises a sorted ordering of the plurality of singleton values in the set of values.

18. The network device of claim 15, wherein searching the first subset includes performing a binary search on the plurality of singletons in the first subset.

19. The network device of claim 15, wherein searching the first subset is performed in O(log(n)) time, where n is a number of members in the first subset and searching the list of ranges is performed in O(n) time, where n is the number of value ranges.

* * * * *